Feb. 13, 1973    F. R. LAURENZ    3,716,032
SELECTIVE ANIMAL GATE
Filed May 26, 1971
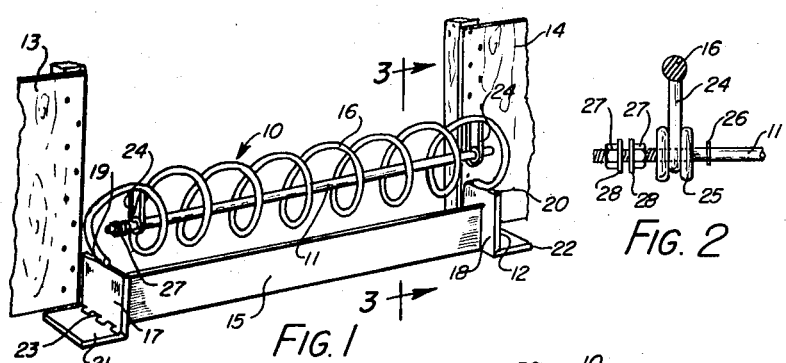
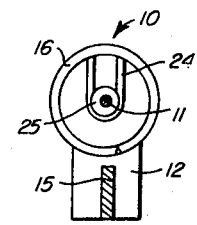
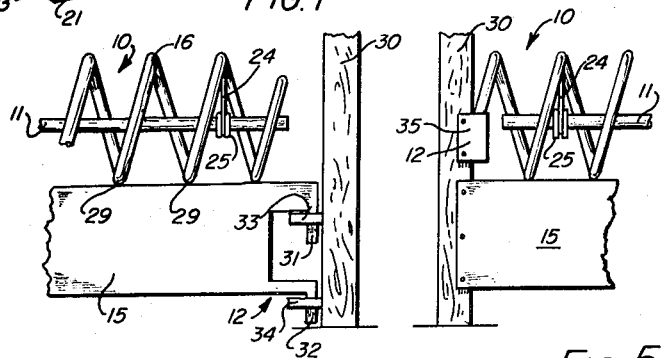
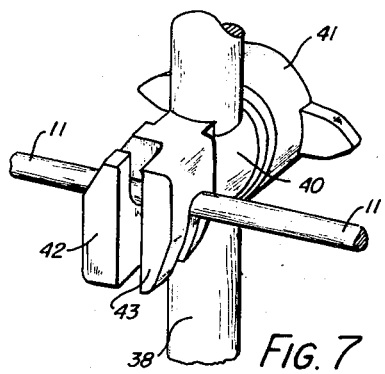
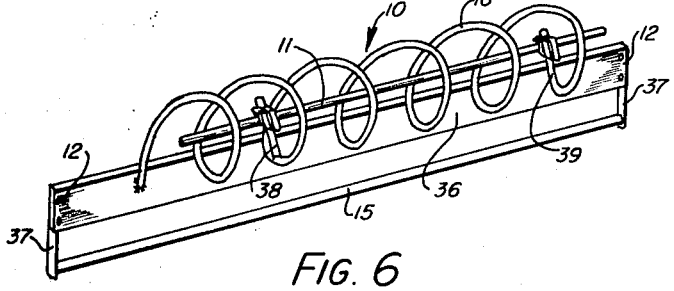
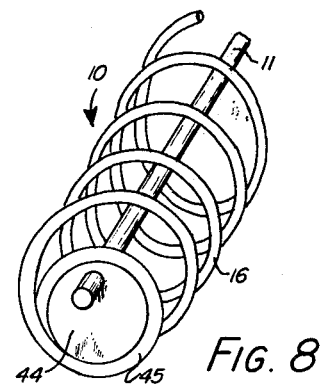
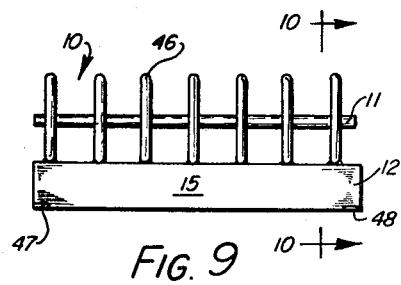
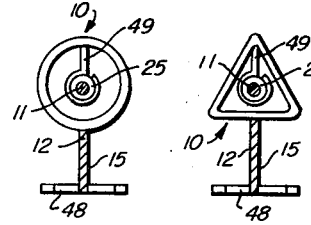
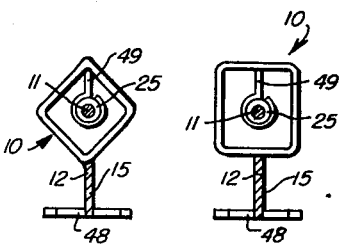
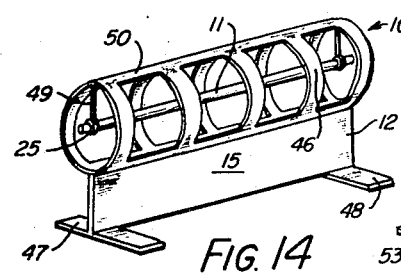
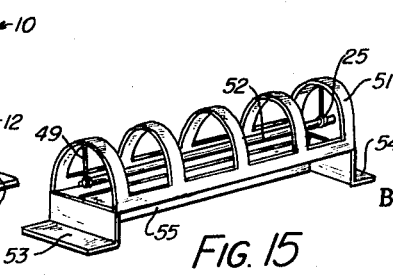
INVENTOR.
FRANK R. LAURENZ
BY
ATTORNEY

United States Patent Office 3,716,032
Patented Feb. 13, 1973

3,716,032
SELECTIVE ANIMAL GATE
Frank R. Laurenz, P.O. Box 359,
Eagle Butte, S. Dak. 57625
Continuation-in-part of application Ser. No. 50,469,
June 29, 1970. This application May 26, 1971,
Ser. No. 146,982
Int. Cl. A01k 29/00
U.S. Cl. 119—155     23 Claims

ABSTRACT OF THE DISCLOSURE

An electric gate for animal pens is taught. It selectively obstructs passage of smaller animals and allows passage of larger or adult animals.

The gate comprises an electrode which is located within and is partially shielded by an elongated cage or housing over which a larger or adult animal may freely pass without suffering exposure to or contact with the electrode. The walls of the elongated cage have repetitive substantially transversely extending or annular-like open spaces aligned sequentially along the length of the cage. The width of these open spaces is sufficient to allow entry of a leg of predetermined smaller animals and consequent deterrent exposure to the interior electrode. To larger animals, the cage provides unsure footing, causing them to preferentially step over it.

The preferred cage is formed of bar-like material or a rod of metal spiralled or looped into a longitudinally extending helical coil.

A critical feature of the invention is the elevated mounting of the cage. Means are provided for mounting it in a horizontal manner across the access opening of an animal pen and in spaced or elevated relationship above the floor surface for the access opening. Dung falling through the elevated cage onto the pen floor surface is thus readily accessible for convenient removal. A barrier wall between the cage and the pen floor surface provides an obstruction barring the escape of smaller animals underneath the elevated cage.

---

This application is a continuation-in-part of my application Ser. No. 50,469, filed June 29, 1970, now abandoned.

This invention relates to a new type of electric gate for animal pens for selectively obstructing passage of predetermined smaller animals and allowing passage of predetermined larger or adult animals. It also relates to animal pens equipped with such a gate.

The gate is especially useful for sow farrowing pens, to permit passage of sows, but obstruct the passage of suckling or young pigs. It is also useful as a means to discriminate between pigs and larger animals. It may even be used as a safety animal gate permitting passage of humans but obstructing passage of such animals as goats or sheep or pigs.

A mighty benefit of this new gate, especially the preferred embodiment, lies in its simplicity of structure and economy of design. It is relatively economical to manufacture.

A significant feature is the ease with which the gate and floor surfaces near it may be kept free of dung. The gate allows dung to fall through and does not serve as an inaccessible trap for floor build-up of debris such as straw-bedding or dung—whether the debris is dropped from above or pushed on the floor toward the gate. Floor surfaces in the area of the gate are readily accessible for cleaning. Thus, problems of debris grounding of an electrode as might be caused by an inaccessible debris build-up are easily avoided.

Several additional benefits of the invention are illustrated by considering the gate in its preferred environment as a gate for sow farrowing pens. Free-stall sow farrowing is now widely recognized as not only a labor-saving approach but also an approach causing sows to become more contented and, in the long run, more productive in terms of mothering their litter through the first few weeks of life when potential loss is greatest. In free-stall farrowing, the sows are free to leave the farrowing stall and roam at will for eating, drinking, exercising and dunging. They return to their young for suckling and to provide warmth after satisfying their needs away from their young. The young animals or piglets, however, should be confined to the farrowing stall, especially during the first few weeks after birth, inasmuch as they require extra warmth and care by the mother. Thus, in free-stall farrowing, the access opening for the farrowing stall should permit easy and safe passage of the sow, but prevent (or at least obstruct) passage of the suckling animals, or smaller animals, without harming them. Further, during their first few hours or possibly days of life, when their coordination and understanding are undeveloped, the young should not normally be subjected to conditions allowing them to be exposed to an electrical shock. But shortly thereafter, especially when they start exploring, exposure to a mild electrical shock at the gate is desirable as a training step to deter them from attempting escape.

Many different types of gates have been proposed for free-stall farrowing. For example, swinging doors have been used; but such doors obscure suckling pigs from the sow or anyone else viewing the pen from the outside. They also are less than effective to retain young ambitious animals with an exploratory bent. Shielded electrode gates have heretofore been suggested (in the form of a hump mounted on the floor) for the purpose of allowing the sow to step over the gate but obstruct suckling pigs. Such gates as heretofore known, however, have been defective in one or more respects. They have not been fully effective to prevent newborn suckling pigs from wandering into and even becoming trapped in the electrode space; or they have been relatively expensive in terms of fabrication cost; or they have been relatively easily damaged as a result of normal conduct by sows; or they have presented problems in terms of floor debris build-up in the electrode space; and they have presented especially difficult and labor consuming problems in terms of cleaning or removal of debris from the floor within their electrode space. They also inherently lack flexibility of adjustment. Still further, a rotatable drum has more recently been suggested for gates of free-stall farrowing, but with unsatisfactory results inasmuch as young piglets soon learn how to escape thereover.

Despite the benefits of free-stall farrowing and the wide recognition of those benefits, a truly satisfactory and economical and labor-saving gate for free-stall farrowing pens has not, insofar as is known, been heretofore available. This invention provides such a gate.

In addition to features aforenoted, this new gate permits external viewing of animals in the pen. It does not serve as any trap for wandering or exploring young animals, but provides means, preferably adjustable, for an electrical shock deterrent against the escape of smaller animals engaged in exploring the possibility of going over or out through the gate. Further, especially in the preferred embodiment, the strength of the gate imparted by design features in the electrode cage part of it is such that it is not easily damaged by the normal conduct of sows.

The gate comprises a housing characterized as a hollow elongated electrode cage. This cage is of sleeve-like character in that the walls along the length of it circumscribe the hollow elongated interior or central portion of it. The walls have repetitive substantially transversely disposed (that is, annular-like) open spaces which are aligned sequentially along the length of the cage. The walls themselves as well as the width of the open spaces thereof are defined by bar-like material. The bar-like material is radially spaced from the central line or axis of the cage and repetitively substantially completely circumscribes, in spaced longitudinal increments along the length of the cage, the elongated hollow central portion of the cage. The bar-like material preferably is spiralled or looped repetitively so as to form a longitudinally extending helical coil. The spirals of the coil are spaced longitudinally along the length of the cage and each spiral completely circumscribes the elongated hollow central portion of the cage. Such a cage is especially strong and resistant to damage by virtue of the bracing inherent between the connected loops or spirals throughout the length of the coil.

The width of the open spaces of the cage walls is between two and eight or ten times the width of the circumscribing bar-like material forming those walls. The width of the open spaces is sufficient to permit ready access for a body part (such as a leg or limb or nose) of an escape-prone smaller animal into the hollow central portion of the cage; but the combination of the open spaces and the bar-like material provides unsure footing for larger animals, causing them to prefer to step over the cage.

An electrode extends longitudinally within the hollow central portion of the cage, and is preferably adjustable within the central portion. It is insulatively mounted in spaced relationship from the walls of the cage to permit charging the electrode without charging the cage. In charged condition, the electrode provides a deterrent electrical shock to animals contacting it through the open spaces.

Means are provided for mounting the cage horizontally across an access opening into an animal pen and in elevated relationship above the pen floor surface at the access opening. Thus, dung falling through the cage onto the floor surface is readily accessible for removal. The elevated mounting also serves in combination with the size of the open spaces of the cage and the physical presence of the electrode therewithin to obstruct smaller animals from lodging their entire bodies within the hollow central portion of the cage.

A barrier wall between the cage and the pen floor surface obstructs that space as an escape route for smaller animals. This barrier wall is exterior to the cage, and preferably disposed somewhat laterally along one side of the elongated cage. It may be fixed to the cage or separated from it or completely adjustable with respect to it.

Significantly, the electrode of the gate is arranged or adjusted so that newborn animals are not needlessly exposed to it by chance or design before they develop sufficient coordination or size to respond by withdrawing their body. However, such animals, after developing that coordination (which sometimes occurs rapidly), as they also increase in size and exploratory tendencies, may attempt to go over the gate. But they are deterred from escape by the combination of the partially-shielded electrode plus the nature of the housing for the electrode and the barrier wall between the electrode housing and the floor of the pen. Thus, the electrode becomes or is adjusted to be effective when needed but is not a significant hazard for the newborn nor the sow or adult.

Other benefits and advantages of the invention will be evident as this description proceeds.

The invention will further be described by reference to a drawing made a part hereof wherein:

FIG. 1 is a schematic perspective view of an access opening into a farrowing pen or crate with a gate having a preferred cage according to this invention extending across the access opening;

FIG. 2 is a fragmentary side view of an electrode holder or mounting permitting displacement of the electrode without damage to it;

FIG. 3 is a schematic sectional view of the gate of FIG. 1, taken on line 3—3 of FIG. 1;

FIGS. 4 and 5 are fragmentary schematic side views of modified gates of this invention;

FIG. 6 is a schematic perspective view of an especially preferred gate according to this invention;

FIG. 7 is an enlarged schematic perspective view of the adjustable electrode holder or mounting as employed in the gate of FIG. 6;

FIG. 8 is a fragmentary perspective view of a cage illustrating an alternate adjustable electrode holder;

FIG. 9 is a schematic side view of an alternate embodiment or style of gate of the invention;

FIGS. 10, 11, 12 and 13 are sectional views taken on line 10—10 of FIG. 9, illustrating a variety of shapes for various embodiments exhibiting the overall side view illustrated in FIG. 9;

FIG. 14 is a schematic perspective view of another alternate embodiment of this invention; and FIG. 15 is a schematic perspective view of a canopy embodiment for a gate incorporating several principles according to this invention.

Each electric gate of the drawing (except FIG. 15) broadly comprises a hollow elongated electrode cage 10 which is of sleeve-like character, but which has a large amount of open space in the walls or "sleeve" of it. An electrode 11 extends longitudinally within cage 10. Means 12 are provided for mounting cage 10 in a horizontal direction across an access opening (defined by pen walls 13 and 14 in FIG. 1) into a pen. The cage is mounted in spaced or elevated relationship above the floor surface for the access opening. A barrier means or wall 15, external to the cage, is present between the electrode cage and floor surface of the pen.

The walls of electrode cage 10 have repetitive elongated open spaces extending in an aligned manner substantially transversely to the length of the cage. These open spaces are annular-like and are aligned sequentially along the length of the cage. The walls of the cage as well as the open spaces thereof are defined by bar-like material radially spaced from and repetitively, in spaced longitudinal increments along the length of the cage, substantially completely circumscribing the hollow central axis portion of the cage. The cage 10 is preferably substantially uniform in cross-sectional shape throughout its length. But it may vary in size along its length (usually with the middle part of it as the largest); or it may vary in cross-sectional shape along its length (preferably cylindrical or circular but optionally having a cross-sectional shape approaching that of an oval or triangle or square).

The open spaces of the walls of the cage always exceed the surface area of the walls occupied by the bar-like material; in fact, the open spaces are at least twice as great as the surface area occupied by bar-like material. Thus, the width (taken along cage length) of the annular-like open spaces is at least twice the width of the annular-like bar separations between them—that is, twice the width of the bar-like material forming the separations.

An especially desired bar-like material forming or defining the walls of the electrode cage is a helical coil of metal 16, as illustrated in FIGS. 1, 3, 4, 5, 6 and 8. Such a coil is formed by spiralling or looping a rod of metal, preferably a round rod, in such a way that the spirals or loops are spaced longitudinally from each other and simultaneously circumscribe a central hollow cage portion extending through the center of the coil. The width of the open spaces between convolutions or loops of the coil are at least twice as great (usually more than three or four times as great, up to possibly eight or even ten times as great) as the width of the bar or rod-like material coiled and forming the walls of the cage.

Coil 16 is supported in spaced elevated relationship from the floor surface of the access opening of the animal pen. In FIG. 1, flange legs 17 and 18 (perpendicular to the axis of coil 16) are suitably welded on one edge, as at 19 and 20, to a lower part of the helical coil 16. A plate 21 and 22 may extend from the lower edge of legs 17 and 18 for bolting the unit to a floor surface. If desired, a pin hinge 23 may join leg 17 and plate 21 to permit tilting of the gate upwardly for cleaning or other purposes. Such a pivot hinge connection is unnecessary, however, since dung falls through the coil 16 and is easily shoveled away from each side of barrier plate 15.

Barrier plate 15 may be fixed (as by welding) between legs 17 and 18, as shown in FIG. 1; or it may be fixed to the cage 10 itself; or it may be separately fixed to a floor surface, or to the lower part of the walls or posts forming the access opening of the pen.

Electrode 11 (suitably a conductive metal rod free of insulation) extends longitudinally within coil 16, that is, within the hollow central portion of the cage formed by coil 16. It is insulatively mounted in spaced relationship from the walls (or loops of the coil 16) of bar-like material forming the cage. Thus, charging of the electrode will not charge the cage.

A suitable electrode mounting is illustrated in FIGS. 1–5, inclusive. As there shown, a U-shaped metal wire or rod 24 depends from and is securely fastened to an uppermost sweep of the convolutions of the rod forming coil 16. The space between the two legs of the U is sufficient to receive an insulating spool 25. Spool 25 has enlarged annular perimeter ridges; and these ridges project annularly outwardly on each side of U-shaped rod 24 (see FIG. 2). Spool 25 may be displaced upwardly within but not laterally out of the U holder. Electrode 11 extends through a central hole in insulator 25. Electrode 11 may be equipped with an annular bead 26, of larger diameter than the hole through the spool 25, to prevent the electrode from shifting laterally (to left as viewed in FIG. 2) through the spool 25. Bolts 27 and washers 28 on the end of the electrode 11 prevent lateral shifting of it to the right as viewed in FIG. 2, and also serve as means for connecting an electric line from a battery source or other electric power source to the electrode.

In FIG. 4, the hollow elongated electrode cage formed by coil 16 is aligned and permanently fixed at intervals along its lower edge, as by spot welds 29, to the upper edge of a metal barrier wall or plate 15. Barrier plate 15 may be hingedly mounted to a side post 30 of the access opening of a pen. Illustratively, an end of the barrier plate may be equipped with vertically depending pin elements 31 and 32 held by ring members 33 and 34 mounted upon post 30.

In FIG. 5, cage 10 formed by coil 16 has longitudinally extending mounting flanges 35 (suitably welded to coil 16 at each end thereof). Flanges 35 serve as the means for bolting or fastening coil 16 to a side post 30 of an access opening. A barrier plate, such as the board 15 illustrated in FIG. 5, is suitably fastened (for example, nailed or bolted) to side posts or edges of the access opening below cage 10. It is perfectly suitable to position the barrier plate at a lateral location with respect to cage 10 instead of directly under cage 10. In fact, a lateral displacement of it, as may be gleaned from FIG. 5 and as expressly illustrated in FIG. 6, is preferred.

In FIG. 6, the means 12 for mounting the cage 10 are at the ends of a longitudinally extending plate or bar 36 which is fixed to loops or spirals of coil 16 along a lateral side of coil 16. Suitably alternate loops of coil 16 are welded to support bar 36. Below bar 36 is located a barrier wall 15, which is illustrated as a bar or rod fixed on arms 37 depending from the mounting means 12 or from the lateral bar 36. If desired lateral bar 36 (which suitably may be in the form of a sheet or strip of metal about ⅛ to ¼ inch thick, or about 3 to 8 millimeters thick) may itself extend downwardly sufficiently to form the barrier wall between cage 10 and a pen floor surface. Thus, barrier wall 15 in this structure is located laterally along one side of the cage 10, and is completely out of the way for cleaning. Further, this gate is easily mounted across a pen opening so as to place the cage part inside the pen, which is advantageous in terms of training exploring animals at an early date to stay clear of the gate.

A further feature of FIG. 6 is the adjustable mounting for the electrode. Electrode holder support arms 38 and 39 extend upwardly from the lowermost sweep of spirals or loops of the coil 16. Normally, arms 38 and 39 will tilt toward one longitudinal direction or the other with respect to cage 10. Ends of coil 16 may be bent to form a support arm as at 39. The electrode holder itself (see FIG. 7) comprises a cross-shaft 40 equipped with a bore hole extending substantially perpendicularly through shaft 40. This bore hole slidably receives a support arm as at 38. A hand tightened nut 41 is cooperatively threaded on one end of cross-shaft 40 for tightening on shaft 40 and frictional engagement against support arm 38. The other end of cross-shaft 40 is slotted from its end to form a bifurcated end. Each part 42 and 43 on opposite sides of the end slot is interiorly grooved in an annular direction (with respect to shaft 40) just sufficiently to allow an electrode bar 11 (after insertion through the end slot) to be turned about 90° with respect to the end slot. The complete electrical holder is preferably made of plastic or similar electrically insulating material. Preferably, the size of the end slot and the grooving for the electrode 11 is just sufficient to receive the electrode and frictionally engage it. This holder permits frictional shifting of the electrode longitudinally within the cage, if desired. It also permits adjusting of the height of the electrode within the cage 10, preferably at a lower level for newborn and a higher level for partially grown animals.

Another adjustable electrode holder is illustrated in FIG. 8. It comprises a disc member 44 mounted in a ring member 45 formed at the end of cage 10. The very end of the bar or rod forming coil 16 may be curved into a substantially ring-like member 45, preferably of slightly smaller diameter than the body of cage 10. Disc 44, suitably of electrically insulating plastic, may be about one to three centimeters in thickness with a groove about its periphery for receiving a portion of the ring-like part 45. The disc 44 is frictionally held by the ring-like part 45, but may be shifted rotatably within the ring-like part 45. A hole in disc 44 receives electrode 11 and frictionally engages the electrode. The hole is radially outward from the center of disc 44 so that rotation of the disc alters the height of the electrode within cage 10.

Reference is now made to the alternative embodiment in FIGS. 9–13, inclusive. Here, the bar-like material defining the walls of the sleeve-like electrode cage is in the form of a series of longitudinally spaced metal bar perimeter shapes 46. These shapes normally will be endless rods in the shape of circles or rings (FIG. 10), triangles (FIG. 11), squares (FIGS. 12 and 13), or the like. Corners or changes of direction for the bars of these shapes are preferably curved or rounded so as to present no sharp edge for discomfort. The shapes may contain a small break or parting, but nevertheless, be properly characterizable as substantially endless or continuous. They are permanently secured, as by welding, in aligned spaced relationship from each other to a longitudinal rod or plate such as the top edge of barrier plate 15. They may project upwardly from the top edge of plate 15 (as illustrated), or they may project laterally of plate 15. Plate 15 is suitably supported in a vertical position by laterally extending leg members or flanges 47 and 48. Electrode 11 extends longitudinally within the hollow central portion of the cage formed by shapes 46; and electrode 11 is suitably fixed in position by two or three mountings consisting of an arm 49 welded to a bar of the cage and extending into the central portion thereof as a hook member for holding the spool insulator 25 within which electrode 11 is held. The discrete character of shapes 46 as well as the need to secure each one in spaced position, as by welding, makes this embodiment less resistant to damage than the preferred coil embodiment aforediscussed.

In the embodiment of FIG. 14, the electrode cage 10 is formed by removing arcuate segments from a pipe or sleeve member 50, thus forming bar perimeter shapes 46 analogous to those shown in FIG. 9. If desired, edges adjacent the cut out sections may be curved inwardly and formed into a bead. Sleeve 50 may also be formed by joining together two hemi-sleeves. The radial orientation of the cage may be shifted, as for example by 90°, to move the arcuate sweep of aligned open spaces to the upper half of the structure. In other respects, the embodiment illustrated in FIG. 11 contains elements analogous to those illustrated in FIG. 9.

While specific dimensions for a suitable cage 10 may vary depending upon the relative size of animals to be barred and permitted passage, some illustrative dimensions for a practical sow farrowing gate will now be discussed.

The electrode cage is suitably three or four up to seven inches (8 or 10 up to 20 centimeters) in height or outer diameter, with an outer diameter or height of about five inches (12 centimeters) preferred. These figures represent the most practical minimum and maximum cross-sectional dimensions, especially for sow farrowing. The bar shapes or coil material may be about three-eighths to one inch (5 or 7 millimeters up to 3 centimeters) in thickness (or diameter) or width, with about one-half inch or five-eighths inch (1 or 1.5 centimeters) preferred. Generally, the strength of the cage should be such as to withstand a distributed weight of at least about 200 pounds (100 kilograms) without suffering collapse or permanent bending. This strength feature is also a safety feature. Sows sometimes may temporarily rest upon the gate as they pass over it. As they do so about 200 pounds (100 kilograms) may be distributed over six or seven or more bar loops of the cage. In this respect, the special relationship between loops of a helical coil, as illustrated in the drawing, provides the best results. Under equal distortion pressures designed to spread loops of otherwise identical bar-like metal, the distortion spread between loops in the helical coil is much less than that between loops in the embodiment of FIG. 9.

For sow farrowing, convolutions or bar shapes suitably are spaced from each other about one or two or even three inches (2 or 5 or even 8 centimeters). But arcuate or annular-type spaces about one and one-fourth inches (3 centimeters) wide are most preferred. Such spacing in combination with the electrode as a physical object (whether or not charged), plus the preferred size (height or diameter) of the cage, and its elevated mounting, all serve to prevent a young piglet from crawling (or lodging its body) inside the cage. However, such spacing is large enough to permit viewing of piglets in the cage (for example, by the sow), and large enough for the feet of a piglet to pass or slip between bar shapes into the interior recess of the cage and receive a deterring shock (e.g., as would occur when a piglet attempts to jump or climb over the gate) when the electrode is charged.

Generally it is desirable to arrange the height and size of the cage so that the smaller and weaker newborn piglets are unable to reach the cage and receive a shock until after at least the first few hours following birth. However, the most active newborn may reach within the cage quite early in life and receive a shock. This is normally not unsatisfactory, since the training of a young piglet to respect the gate and stay back from it should start soon after he exhibits the coordination and curiousity for exploring his environment. Significantly also, the arcuate or annular-like shape of the spaces, as well as the relative lack or absence of longitudinal cage bars or elements for a piglet to hook his leg on in attempting to climb over the gate, both contribute to the effectiveness of the gate as a deterrent for exploring piglets. Thus, any optional longitudinal bars as part of the cage are, if used at all, used only sparingly and are so greatly spaced that they do not serve as elements for a piglet to support his hoofs continually upon for complete transit over the cage. For example, even if one such longitudinal bar may be employed as part of the wall structure of the cage, its position, according to the teaching herein, is such that a piglet hooking his hoof on it would on further movement find his legs slipping into the recess of the cage and receiving a deterring shock. By far the most preferred cages do not have such additional longitudinal bars. Thus the helical coil cage is by its very nature the most effective.

The gate mounting optionally is such that the ends of the cage may be blocked from access by piglets; but this is unnecessary and frequently undesired. Since the sleeve-like cage is off the ground, its ends, which preferably remain open, are accessible for electric shock only to an ambitious exploring piglet even when the cage is mounted to extend into the pen side of a pen access opening, as is preferred.

The voltage for the electrode may be varied from relatively low up to that customary for electric fences (with low amperage), as the deterrent effect of shock becomes more necessary with growth of the animals. But standard voltages and amperages as employed for conventional electric fences on farms are most conveniently maintained. An intermittent or pulsing electric source for charging the electrode is preferred.

Barrier 15 preferably is sufficient in size to block a passage of at least four inches (10 cm.), usually six inches (15 cm.), or more in height. It is suitably (if not in contact or secured to the lower edge of the cage 10) fixed with its upper edge no more than an inch or so (2 or 3 cm.) below or laterally apart from the cage 10. In general, cage 10 is mounted for sow farrowing pens with its lower edge at least four or five inches (10 or 13 cm.) above the floor of the access opening. But, the lower edge may be around seven inches (18 or 20 cm.) or so above the floor, up to 10 inches (25 cm.) or possibly 12 inches (30 cm.), or more, above the floor, with a barrier wall blocking the escape route between it and the floor. The barrier is not cage-like, but is a single wall or sheet, preferably metal, with or without small holes or screen openings or slots or other open spaces in it.

For sow farrowing, the upper edge of cage 10 should be at least 8 inches (20 centimeters) up to 12 inches (30 cm.) or possibly 14 inches (35 cm.), or slightly more, above the floor.

FIG. 15 shows an elongated canopy formed out of a plate metal (e.g., one-eighth inch thick; or about 3 millimeters) shaped or curved into a hemi-sleeve or a hemi-hedral sleeve. Arcuate segments are removed; and remaining edges may be curved inwardly into a bead. In all cases, the housing walls have repetitive slot-like open spaces aligned sequentially and substantially transversely along the length thereof. The housing walls and the width of open spaces, taken along the length of the housing, are defined by bar-like material (or arcuate metal segments) oriented transversely to the housing length. Electrode 52 is insulatively spaced under the canopy housing and within the canopy recess. Angle iron legs 53 and 54, welded to the canopy, provide means for fixing the canopy in elevated relationship above a pen floor. Barrier 55, preferably not aligned down the center under the electrode, extends between the canopy and floor. It may be placed nearest the canopy edge facing the pen, or at the opposite edge, or anywhere between. The canopy may be radially tilted or shifted to place the edge of one side lower than the other. A canopy, however, is less preferred not only from the standpoint of expense in manufacture, but also from the standpoint of functional performance in use.

Elements and features illustrated and described may be interchangeably combined in a variety of ways to provide a gate having the important features taught herein. That which is claimed is:

1. An electric gate useful for animal pens to permit passage of predetermined larger animals over the gate and obstruct passage of predetermined smaller animals, and easy to keep free of dung, said gate comprising:
    (i) a hollow elongated electrode cage of sleeve-like character, the walls of which have repetitive annular-like open spaces aligned sequentially along the length of said cage, said walls and the width of said open spaces thereof along said length being defined by bar-like material which repetitively, in spaced longitudinal increments along said length, substantially completely circumscribes the elongated hollow central portion of said cage, the width of said open spaces of said walls being between 2 and 10 times the width of said bar-like material of said walls,
    (ii) an electrode extending longitudinally within said cage and insulatively mounted in spaced relationship from the walls thereof to permit charging said electrode without charging said cage, said electrode in charged condition providing a deterrent electrical shock to animals contacting it through said cage open spaces,
    (iii) means for mounting said cage horizontally across an access opening into a pen and in elevated relationship above the pen floor surface at said access opening, whereby dung falling through said cage onto said floor surface is readily accessible for removal, and
    (iv) a barrier wall exterior to said cage obstructing escape of said smaller animals through the space between said cage and said pen floor surface.

2. The gate of claim 1 wherein said electrode cage is further characterized by the fact that the bar-like material thereof is spiralled into a helical coil with the spirals of said coil in said spaced longitudinal increments along said cage length.

3. The gate of claim 2 wherein the helical coil is essentially uniform and cylindrical throughout its length.

4. The gate of claim 2 wherein the width of said open spaces of said cage is not in excess of five centimeters.

5. The gate of claim 2 wherein said cage has a minimum cross sectional dimension of at least about 8 centimeters and a maximum cross sectional dimension not over about 20 centimeters.

6. The gate of claim 2 having means permitting adjustment of the height of said electrode within said cage.

7. The gate of claim 2 wherein said barrier wall is disposed laterally to said elongated cage.

8. The gate of claim 2 wherein the means for mounting said cage in elevated relationship above a pen floor surface comprises means fixed to the bar-like material of said cage.

9. The gate of claim 2 wherein said barrier wall is permanently fixed to said cage.

10. The gate of claim 2 wherein said means for mounting said cage in elevated relationship above a pen floor surface comprises, at least in part, means fixed to said barrier wall.

11. The gate of claim 1 wherein the width of said open spaces of said cage is not in excess of five centimeters.

12. The gate of claim 1 wherein said cage has a minimum cross sectional dimension of at least about 8 centimeters and a maximum cross sectional dimension not over about 20 centimeters.

13. The gate of claim 1 having means permitting adjustment of the height of said electrode within said cage.

14. The gate of claim 1 wherein said barrier wall is disposed laterally to said elongated cage.

15. The gate of claim 1 wherein the means for mounting said cage in elevated relationship above a pen floor surface comprises means fixed to the bar-like material of said cage.

16. The gate of claim 1 wherein said barrier wall is permanently fixed to said cage.

17. The gate of claim 1 wherein said means for mounting said cage in elevated relationship above a pen floor surface comprises, at least in part, means fixed to said barrier wall.

18. The gate of claim 1 wherein said electrode cage is further characterized by the fact that the bar-like material thereof consists essentially of a plurality of annular-like bar perimeter shapes permanently secured in substantially aligned spaced relationship to a longitudinal member extending the length of said cage.

19. The gate of claim 18 wherein said bar perimeter shapes are discrete shapes secured to said longitudinal member.

20. The gate of claim 18 wherein said bar perimeter shapes are formed by removing arcuate segments from a solid sleeve of metal.

21. The gate of claim 18 wherein said longitudinal member is united to said barrier wall.

22. An animal pen having an access opening across which the gate of claim 1 is mounted.

23. An electric gate useful for animal pens to permit passage of predetermined larger animals over the gate and obstruct passage of predetermined smaller animals, and easy to keep free of dung, said gate comprising,
    (i) an elongated electrode canopy of plate metal shaped in the form of a hemi-sleeve, said canopy having repetitive arcuate open spaces therein aligned sequentially substantially transversely to the length thereof, said width of said arcuate open spaces being between 2 and 10 times the width of the metal separations therebetween,
    (ii) an electrode extending under said canopy longitudinally within the recess defined by said canopy and insulatively mounted in spaced relationship from said canopy to permit charging said electrode without charging said canopy, said electrode in charged condition providing a deterrent electrical shock to animals contacting it through said canopy open spaces,
    (iii) means for mounting said canopy horizontally across an access opening into a pen and in elevated relationship above the pen floor surface at said access opening, whereby dung falling through said canopy onto said floor surface is readily accessible for removal, and
    (iv) a single barrier wall between said elevated canopy and said pen floor surface for obstructing escape of said smaller animals underneath said canopy.

References Cited
UNITED STATES PATENTS

| | | | |
|---|---|---|---|
| 3,208,433 | 9/1965 | McDermott | 119—155 |
| 2,023,835 | 12/1935 | Heiken | 119—155 |
| 2,376,630 | 5/1945 | Stentz | 119—155 |

HUGH R. CHAMBLEE, Primary Examiner